United States Patent
Dickson et al.

(10) Patent No.: US 8,861,513 B2
(45) Date of Patent: Oct. 14, 2014

(54) FAULT TOLERANT PARALLEL RECEIVER INTERFACE WITH RECEIVER REDUNDANCY

(71) Applicant: International Business Machines Corporation, Armonk, NY (US)

(72) Inventors: Timothy O. Dickson, Danbury, CT (US); Daniel M. Dreps, Georgetown, TX (US); Frank D. Ferraiolo, Naples, FL (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 13/736,353

(22) Filed: Jan. 8, 2013

(65) Prior Publication Data

US 2013/0343402 A1 Dec. 26, 2013

Related U.S. Application Data

(60) Provisional application No. 61/675,148, filed on Jul. 24, 2012, provisional application No. 61/664,266, filed on Jun. 26, 2012.

(51) Int. Cl.
| | |
|---|---|
| *H04L 12/50* | (2006.01) |
| *H04L 12/28* | (2006.01) |
| *H04L 12/66* | (2006.01) |
| *H04J 3/02* | (2006.01) |
| *H04L 27/00* | (2006.01) |
| *H04L 12/24* | (2006.01) |
| *G06F 13/00* | (2006.01) |
| *H04L 12/933* | (2013.01) |

(52) U.S. Cl.
CPC ............... *H04L 41/00* (2013.01); *G06F 13/00* (2013.01); *H04L 49/10* (2013.01)
USPC ........... 370/359; 370/419; 370/463; 370/537; 375/316

(58) Field of Classification Search
CPC ... H04L 7/0008; H04L 7/0025; H04L 7/0337; H04L 7/0338; H04L 7/043; H04L 7/0996; H04L 7/10; H04L 1/22; H04L 1/24; H04L 25/14; H04L 49/30; H03M 9/00
USPC ......... 370/257, 357–368, 402–403, 419–424, 370/438–440, 463, 489–490, 502, 370/535–545; 375/136–152, 267, 299, 316, 375/347–349
See application file for complete search history.

(56) References Cited

U.S. PATENT DOCUMENTS

| | | | |
|---|---|---|---|
| 6,317,442 B1 | 11/2001 | Ngai | |
| 7,069,458 B1 * | 6/2006 | Sardi et al. | 713/401 |

(Continued)

FOREIGN PATENT DOCUMENTS

| | | |
|---|---|---|
| GB | 2 336 075 A | 10/1999 |
| WO | WO 2008/022886 A1 | 2/2008 |

OTHER PUBLICATIONS

Ip et al., "100G and Beyond Transmission Technologies for Evolving Optical Networks and Relevant Physical-Layer Issues", Proceedings of the IEEE, vol. 100, No. 5, May 2012, pp. 1065-1078.

(Continued)

*Primary Examiner* — Tri H Phan
(74) *Attorney, Agent, or Firm* — Scully, Scott, Murphy & Presser, P.C.; Anne V. Dougherty, Esq.

(57) ABSTRACT

A communications parallel bus receiver interface having N+1 data lines and method of operation. The parallel bus interface employs receiver redundancy at the bus level such that there are N+1 receiver devices. One of the N+1 data signals comprising a spare data signal when a failure occurs in a corresponding channel transmitting one of N parallel data signals. An input switching network is configured to receive and couple N+1 parallel data signals along respective paths to corresponding parallel-configured bit receiver devices, and adapted to couple one received data signal to two or three adjacent bit receivers. A calibration device calibrates one of the two or three adjacent bit receivers, and a qualification device qualifies data decisions made during calibration processes performed by the calibration device. The method cycles through N+1 receivers for periodic recalibration of each receiver (one at a time) while N+1 inputs are processed continuously and uninterrupted.

21 Claims, 8 Drawing Sheets

(56) References Cited

U.S. PATENT DOCUMENTS

| | | | |
|---|---|---|---|
| 7,072,355 B2* | 7/2006 | Kizer | 370/463 |
| 7,428,553 B2 | 9/2008 | Shin | |
| 2006/0159113 A1* | 7/2006 | Kizer | 370/419 |
| 2010/0005345 A1 | 1/2010 | Ferraiolo et al. | |
| 2011/0268133 A1 | 11/2011 | Cucchi et al. | |
| 2012/0106687 A1 | 5/2012 | Bulzacchelli et al. | |
| 2012/0151247 A1* | 6/2012 | Ferraiolo et al. | 714/4.5 |
| 2012/0314721 A1* | 12/2012 | Bulzacchelli et al. | 370/503 |

OTHER PUBLICATIONS

Jaussi et al., "8-Gb/s Source-Synchronous I/O Link With Adaptive Receiver Equalization, Offset Cancellation, and Clock De-Skew", IEEE Journal of Solid-State Circuits, vol. 40, No. 1, pp. 80-88, Jan. 2005.

Beukema et al., "A 6.4-Gb/s CMOS SerDes Core With Feed-Forward and Decision-Feedback Equalization", IEEE Journal of Solid-State Circuits, vol. 40, No. 12, pp. 2633-2645, Dec. 2005.

* cited by examiner

| | $t_1$ | $t_2$ | $t_3$ | $t_4$ | $t_5$ | $t_6$ | $t_7$ | $t_8$ | $t_9$ |
|---|---|---|---|---|---|---|---|---|---|
| RX1 | CAL ($D_1$) | $D_1$ | $D_1$ | $D_1$ | $D_1$ | $D_1$ | $D_1$ | $D_1$ | $D_1$ |
| RX2 | $D_1$ | CAL ($D_2$) | $D_2$ | $D_2$ | $D_2$ | $D_2$ | $D_2$ | $D_2$ | $D_2$ |
| RX3 | $D_2$ | $D_2$ | CAL ($D_3$) | $D_3$ | $D_3$ | $D_3$ | $D_3$ | $D_3$ | $D_3$ |
| RX4 | $D_3$ | $D_3$ | $D_3$ | CAL ($D_4$) | $D_4$ | $D_4$ | $D_4$ | $D_4$ | $D_4$ |
| RX5 | $D_4$ | $D_4$ | $D_4$ | $D_4$ | CAL ($D_5$) | $D_5$ | $D_5$ | $D_5$ | $D_5$ |
| RX6 | $D_5$ | $D_5$ | $D_5$ | $D_5$ | $D_5$ | CAL ($D_7$) | $D_7$ | $D_7$ | $D_7$ |
| RX7 | $D_7$ | $D_7$ | $D_7$ | $D_7$ | $D_7$ | $D_7$ | CAL ($D_8$) | $D_8$ | $D_8$ |
| RX8 | $D_8$ | $D_8$ | $D_8$ | $D_8$ | $D_8$ | $D_8$ | $D_8$ | CAL ($D_9$) | D9 |
| RX9 | $D_9$ | $D_9$ | $D_9$ | $D_9$ | $D_9$ | $D_9$ | $D_9$ | $D_9$ | CAL ($D_9$) |

FIG. 5

| | $t_{10}$ | $t_{11}$ | $t_{12}$ | $t_{13}$ | $t_{14}$ | $t_{15}$ | $t_{16}$ | $t_{17}$ |
|---|---|---|---|---|---|---|---|---|
| $RX_1$ | $D_1$ | $D_1$ | $D_1$ | $D_1$ | $D_1$ | $D_1$ | $D_1$ | CAL ($D_1$) |
| $RX_2$ | $D_2$ | $D_2$ | $D_2$ | $D_2$ | $D_2$ | $D_2$ | CAL ($D_1$) | $D_1$ |
| $RX_3$ | $D_3$ | $D_3$ | $D_3$ | $D_3$ | $D_3$ | CAL ($D_2$) | $D_2$ | $D_2$ |
| $RX_4$ | $D_4$ | $D_4$ | $D_4$ | $D_4$ | CAL ($D_3$) | $D_3$ | $D_3$ | $D_3$ |
| $RX_5$ | $D_5$ | $D_5$ | $D_5$ | CAL ($D_4$) | $D_4$ | $D_4$ | $D_4$ | $D_4$ |
| $RX_6$ | $D_7$ | $D_7$ | CAL ($D_5$) | $D_5$ | $D_5$ | $D_5$ | $D_5$ | $D_5$ |
| $RX_7$ | $D_8$ | CAL ($D_7$) | $D_7$ | $D_7$ | $D_7$ | $D_7$ | $D_7$ | $D_7$ |
| $RX_8$ | CAL ($D_8$) | $D_8$ | $D_8$ | $D_8$ | $D_8$ | $D_8$ | $D_8$ | $D_8$ |
| $RX_9$ | $D_9$ | $D_9$ | $D_9$ | $D_9$ | $D_9$ | $D_9$ | $D_9$ | $D_9$ |

FIG. 6

|     | $t_0$ | $t_1$ | $t_2$ | $t_3$ | $t_4$ | $t_5$ | $t_6$ | $t_7$ |
|-----|-------|-------|-------|-------|-------|-------|-------|-------|
| RX1 | $D_1$ | $D_1$ | $D_1$ | $D_1$ | $D_1$ | $D_1$ | $D_1$ | CAL ($D_1$) |
| RX2 | $D_2$ | $D_2$ | $D_2$ | $D_2$ | $D_2$ | $D_2$ | UNUSED ($D_1$) | $D_1$ |
| RX3 | $D_3$ | $D_3$ | $D_3$ | $D_3$ | $D_3$ | UNUSED ($D_2$) | $D_2$ | $D_2$ |
| RX4 | $D_4$ | $D_4$ | $D_4$ | $D_4$ | UNUSED ($D_3$) | $D_3$ | $D_3$ | $D_3$ |
| RX5 | $D_5$ | $D_5$ | $D_5$ | UNUSED ($D_4$) | $D_4$ | $D_4$ | $D_4$ | $D_4$ |
| RX6 | $D_7$ | $D_7$ | UNUSED ($D_5$) | $D_5$ | $D_5$ | $D_5$ | $D_5$ | $D_5$ |
| RX7 | $D_8$ | UNUSED ($D_7$) | $D_7$ | $D_7$ | $D_7$ | $D_7$ | $D_7$ | $D_7$ |
| RX8 | UNUSED ($D_8$) | $D_8$ | $D_8$ | $D_8$ | $D_8$ | $D_8$ | $D_8$ | $D_8$ |
| RX9 | $D_9$ | $D_9$ | $D_9$ | $D_9$ | $D_9$ | $D_9$ | $D_9$ | $D_9$ |

FAULT TOLERANT PARALLEL RECEIVER INTERFACE WITH RECEIVER REDUNDANCY

RELATED APPLICATIONS

The present application relates to and claims the benefit of the filing dates of U.S. provisional application Ser. No. 61/664,266 filed Jun. 26, 2012 and 61/675,148 filed Jul. 24, 2012, both of which are incorporated herein by reference.

GOVERNMENT CONTRACT

This invention was made with Government support under Contract No.: H98230-07-C-0409 (awarded by National Security Agency (NSA)). The Government has certain rights in this invention.

FIELD

The present disclosure generally relates high-speed communication interfaces, such as high-speed parallel bus interface for integrated circuits, and more particularly to a fault-tolerant implementation of receiver redundancy within a parallel receiver interface to enable calibrations of all receivers in the parallel interface without interrupting data processing.

BACKGROUND

High-speed serial I/O is a critical part of computing systems. In server applications where I/O number in the thousands, achieving low-power and low-area I/O circuitry is paramount. It is common for receivers to be calibrated (i.e., determine sampling clock phase, equalizer coefficients, offset settings, etc) at startup; however, failure to recalibrate during normal receiver operation makes the links susceptible to temperature drifts. Redundant hardware can be employed to enable continuous link recalibration without interrupting data transmission. For example, at the bit receiver level additional parallel paths can be included to enable eye monitoring capabilities or edge sampling for timing recovery. These paths are included in parallel with a data sampling path which processes data in an uninterrupted fashion. This level of redundancy results in at least 100% hardware overhead. To reduce the overhead in a parallel interface, redundant lanes can be included. This approach includes at least one additional transmitter, channel, and receiver within an N-wide parallel interface. N+1 lanes can be included such that N lanes are available for continuous data communication, while the extra lane permits recalibration of all lanes in a "round-robin" fashion. Either approach results in higher power consumption due to the extra circuitry involved. The latter approach also requires additional C4 pins in a parallel interface to enable the extra lane. Moreover, protocol overhead is required to schedule which lane is being recalibrated, and which of the N lanes contain information about the data that is being communicated.

It would be highly desirable to employ bus-level redundancy only within the receiver of a parallel interface to permit periodic recalibration of all receivers in the presence of a faulty transmission channel. This avoids the 100% overhead associated with bit-receiver level redundancy. Moreover, it avoids the transmit and lane overhead at the bus level associated with lane redundancy.

BRIEF SUMMARY

There is provided, in one aspect, a system and method to employ a fault-tolerant receiver redundancy at the data bus level rather than using an additional redundant lane. This enables periodic recalibration of all of the receivers in a bus while still permitting for the inclusion of a spare transmission channel (or lane) required to make the interface tolerant to a single lane failure or fault. Moreover, periodic recalibration of all receivers in the bus is achieved without overhead in the transmitter and the protocol layer, and does not require additional C4 pins in the bus.

In one aspect, there is provided a fault-tolerant parallel I/O bus receiver interface and method of operating. The fault-tolerant parallel I/O bus receiver interface comprises: an input switching network configured to receive and couple N+1 parallel data signals along respective paths to corresponding receiver devices of N+1 parallel-configured bit receiver devices, one of the N+1 parallel data signals comprising a spare data signal, N received parallel data signals configured for coupling along respective paths to corresponding N receiver devices of N+1 parallel-configured bit receiver devices, and a remaining one received parallel data signal configured for coupling to two adjacent bit receiver devices of two or three adjacent parallel bit receivers devices; a calibration logic device used for calibrating one of the N+1 bit receivers during a calibration cycle; a qualification logic device used to qualify data decisions made during calibration processes performed by the calibration logic device, wherein a same data signal being input to a receiver for calibrating the receiver during the calibration cycle is provided to either an adjacent receiver of the receiver being calibrated, or one of two bit receivers adjacent to the receiver being calibrated; and an output switching network configured to route an output of the bit receiver being calibrated to the calibration logic block, and simultaneously route outputs of the remaining N bit receivers of the N+1 parallel-configured receivers as N-bit wide parallel data signal outputs, wherein one output of an adjacent receiver receiving the same data signal during the calibration cycle is simultaneously routed to the qualification logic block.

In a further aspect, a method for calibrating receivers of a parallel I/O bus receiver interface is provided. The method comprises: receiving N+1 parallel data signals along respective paths, one of the N+1 parallel data signals comprising a spare data signal; coupling received N parallel data signals along respective paths to corresponding N receiver devices of N+1 parallel-configured bit receiver devices, and coupling a remaining one received parallel data signal to two adjacent bit receivers or two adjacent bit receivers of two or three adjacent parallel bit receivers; calibrating, using a calibration logic device, one of the two adjacent bit receiver devices during a calibration cycle; qualifying, using a qualification logic device, data decisions made during calibration processes performed by the calibration logic device, wherein a same data signal being used for calibrating a receiver during the calibration cycle is provided to the adjacent receiver of either the two adjacent or the three adjacent bit receivers; and configuring an output switching network to route an output of the bit receiver being calibrated to the calibration logic block, and simultaneously route outputs of the remaining N bit receivers of the N+1 parallel-configured receivers as N-bit wide parallel data signal outputs, wherein one output of an adjacent receiver receiving the same data signals during the calibration cycle is simultaneously routed to the qualification logic block.

BRIEF DESCRIPTION OF THE SEVERAL VIEWS OF THE DRAWINGS

The objects, features and advantages of the present invention will become apparent to one of ordinary skill in the art, in view of the following detailed description taken in combination with the attached drawings, in which.

DETAILED DESCRIPTION

Commonly-owned co-pending U.S. Patent Application No. 61/664,266 describes a parallel receiver interface with receiver redundancy ("receiver shadowing") and a method for implementing receiver calibration with no bandwidth reduction by permitting periodic recalibration (e.g., in a round-robin fashion) of N+1 bit receivers processing N input bits. This was accomplished by routing any given input pin to two (2) receivers such that one receiver could be calibrated, while the other receiver was processing the data and providing qualifications to the calibration process as needed.

The present disclosure enhances the receiver shadowing architecture by adding additional structure to permit the inclusion of a data spare in the bus, and consequently, is tolerant to packaging or other faults such as an open circuit in the data channel between transmitter and receiver.

Particularly, a modified fault-tolerant receiver shadowing architecture still uses N+1 receivers to process N input bits. However, for an N+1 input bus with spare, each pin is routed to the input of 3 adjacent bit receivers (with the exception of the first and last lines in the bus, which only need to be routed to 2 adjacent bit receivers). This permits the ability to seamlessly cycle through and calibrate each receiver, even if there is a failure in one of the channels.

Figure 1:
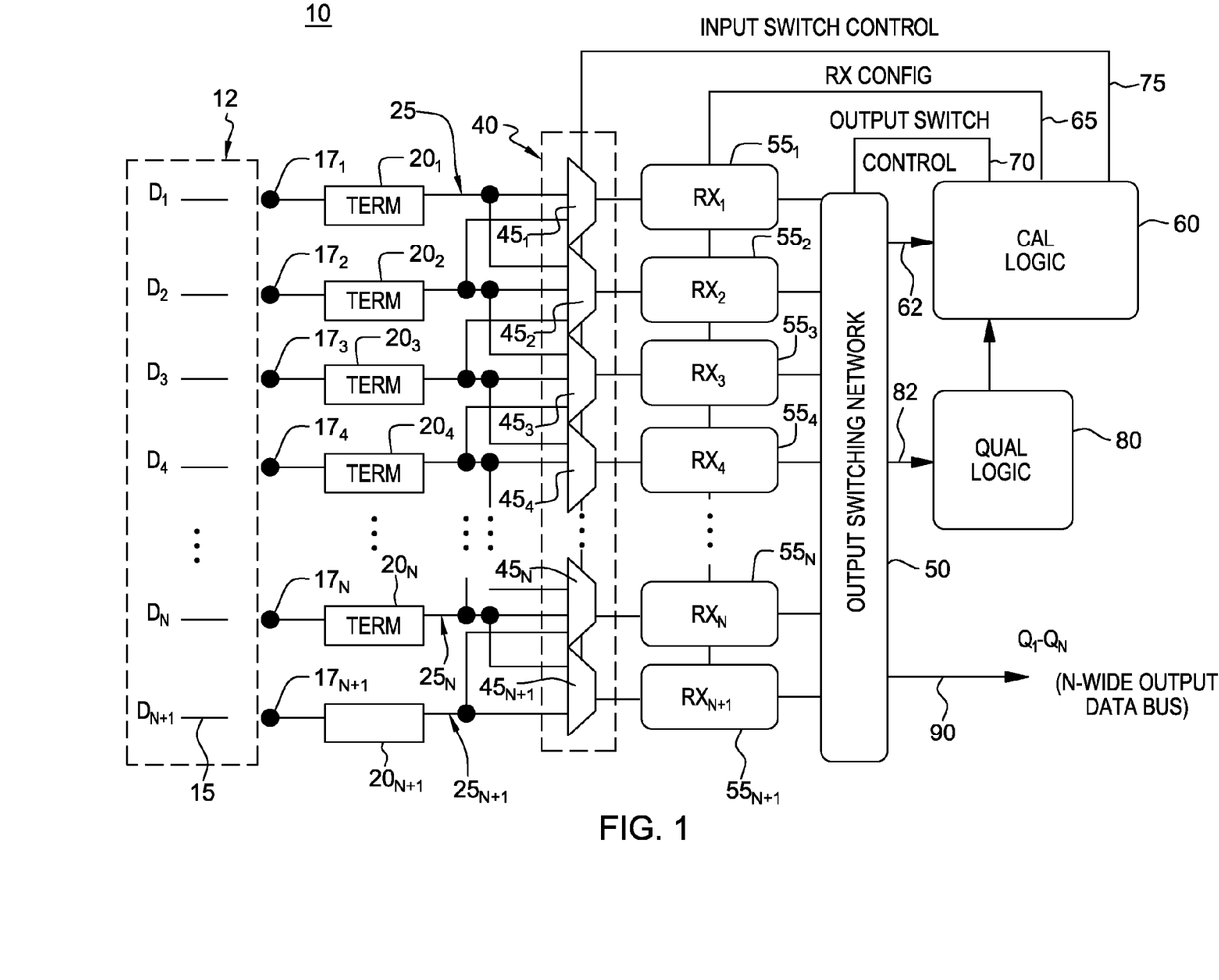
FIG. 1 depicts an embodiment of a fault-tolerant parallel receiver architecture 10 using receiver redundancy.

FIG. 1 depicts a high-speed (e.g., multi-Gb/s speeds) communications parallel bus interface 10 implementing fault-tolerant receiver shadowing according to one embodiment.

As shown in FIG. 1, the interface 10 is a parallel I/O bus interface 10 which includes $RX_1, \ldots, RX_{N+1}$ bit receivers 55 to receive N+1 bits of data $D_1, \ldots, D_{N+1}$. In the embodiments described, there are N data carrying bits and a single (one) spare bit. As known in the art, each receiver RX may include a bit slicer (e.g., a latch, a flip-flop, or comparator) and/or other circuitry, e.g., analog equalizers (e.g., continuous-time linear equalizers CTLEs, feed-forward equalizers FFEs, or decision feedback equalizers DFEs), amplifiers, variable gain amplifiers, and circuitry used to adjust the optimal sampling position of the data relative to a clock (e.g. delay elements, delay-locked loops, or phase interpolators). In order to optimize link performance, it is desirable to perform one or more calibration operations within a bit receiver including, but not limited to: adaptive bit equalization, gain adjustment, clock de-skew or sampling clock phase adjustment, and offset cancellation. In the non-limiting example implementation depicted in FIG. 1, the interface may be scaled for N=8, 16 or some multiple number of parallel bit implementations. The parallel I/O bus interface 10 is configured for performing continuous periodic calibration as described in further detail below.

As known in the art, a data source device, e.g., an integrated circuit in a computing device such as a computer or server, includes a parallel configuration of N+1 transmitter devices (not shown) that generate/drive respective data signals $D_1, \ldots, D_{N+1}$ in parallel over N+1 conductors, i.e., data transmission lines or links 15, forming N-bit wide parallel communications bus 12. Although not shown, it is understood that the set of transmitters drive data signals via I/O ports each including a respective I/O pin (not shown) that couples the signals to its connected data line 15.

At the receiver side, interface 10 includes an integrated circuit including high-speed digital communication receiver interface components, wherein data bit signals $D_1, \ldots, D_{N+1}$ are coupled from respective transmitters over data lines 15 of bus 12 to respective I/O pins $17_1, \ldots, 17_{N+1}$ having respective connected impedance matching input connector or termination $20_1, \ldots, 20_{N+1}$ (e.g., a 50 ohm termination resistor or 100 ohm differential termination resistor). Each respective termination $20_1, \ldots, 20_{N+1}$ is coupled to input switching network 40 comprising a configuration of multiplexer or selector (MUX) circuits $45_1, \ldots, 45_{N+1}$ operating to pass an input data signal to a corresponding receiver device RX 55 of a parallel configuration of receiver devices $55_1, \ldots, 55_{N+1}$ that receive (i.e., sample) a respective data bit signal $D_1, \ldots, D_N, D_{N+1}$ from a respective data line 15.

In the interface architecture 10 of FIG. 1, MUX or selector circuits $45_2, \ldots, 45_N$ at the input of each bit receiver $RX 55_2, \ldots, 55_N$ in the parallel interface are configured to allow the data signal $D_i$ (i=2, . . . , N, N+1) from one pin to be routed to three possible adjacent bit receivers: the corresponding $RX_i$ and two adjacent receivers, e.g., $RX 55_{i-1}$ and $RX 55_{i+1}$. Thus, MUX devices $45_2, \ldots, 45_N$ at inputs of respective receivers $55_2, \ldots, 55_N$ are 3:1 multiplexors. For example, a conductor supplying data signal $D_2$ to MUX or selector circuit $45_2$ for receipt at corresponding receiver RX $55_2$ is tapped or split such that one input of MUX or selector circuit $45_1$ also receives data signal $D_2$ and one input of MUX or selector circuit $45_3$ also receives data signal $D_2$. Consequently, the parallel interface can be configured such that any of three receivers RX $55_1$, RX $55_2$ and RX $55_3$ can receive data signal $D_2$. The configuration is the same for successive data signals of bus 12. Thus, for example, with respect to data signal $D_N$, the conductor supplying data signal $D_N$ to MUX or selector circuit $45_N$ for receipt at corresponding receiver RX $55_N$ is tapped or split such that one input of MUX or selector circuit $45_{N-1}$ (not shown) also receives data signal $D_N$ and one input of MUX or selector circuit $45_{N+1}$ also receives data signal $D_N$. Consequently, the parallel interface can be configured such that any one three receivers RX $55_{N-1}$, RX $55_N$ and RX $55_{N+1}$ can receive data signal $D_N$.

However, as shown in FIG. 1, data signals $D_1$ and $D_{N+1}$ are configured to be routed to corresponding receivers RX $55_1$ and RX $55_{N+1}$, respectively, and only one (1) additional adjacent receiver. For example, conductor 25 supplying data signal $D_1$ to MUX or selector circuit $45_1$ for receipt at receiver RX $55_1$ is tapped off or split such that one input of MUX or selector circuit $45_2$ also receives data signal $D_1$. Consequently, the parallel interface can be configured (i.e. programmed or controlled by logic) such that one or both of receivers RX $55_1$ and RX $55_2$ receives data signal $D_1$. Similarly, conductor $25_{N+1}$ supplying data signal $D_{N+1}$ to MUX or selector circuit $45_{N+1}$ for receipt at receiver RX $55_{N+1}$ is tapped off or split such that one input of MUX or selector circuit $45_N$ also receives data signal $D_{N+1}$. Consequently, the parallel interface can be configured (i.e. programmed or controlled by logic) such that one or both of receivers RX $55_N$ and RX $55_{N+1}$ receives data signal $D_{N+1}$. Thus, MUX devices at inputs of receivers $55_1$ and $55_{N+1}$ are 2:1 multiplexors.

In general, the interface 10 architecture includes N+1 receivers for N+1 data lines (one data line of which constituting a "spare" data line), wherein the MUX or selector circuit $45_i$ at the input of each bit receiver in the parallel interface, allows a data signal from one pin to be routed to a one of two or one of three bit receivers in accordance with receiver configuration control signals 65 and input switching network control signals 75 generated according to programmed receiver and calibration logic device 60 as will be discussed in detail below.

As a result of incorporating a redundant bit receiver (i.e., N+1 bit receivers to process N+1 data signals (one being a spare) in the parallel interface, one bit receiver can be calibrated (e.g., updating information regarding optimal sampling position, equalizer coefficients, and/or offset compensation) while the remaining N receivers can operate as normal, receiving and recovering data, even if a fault occurs in one of the N+1 transmission channels. It is assumed that a mechanism exists for detecting the fault (e.g., at startup during initialization routines, or in real-time through the use of error-correcting or other codes) and that it is known at all time which data signal is faulty during the calibration routines described below. The present disclosure is independent of the mechanism for detecting the fault.

In the embodiment, each RX receiver need a 3:1 mux or selector circuit $45_i$ at the input (except for first and last receivers, which only need a 2:1 mux). It is understood that, at a given time, if any two receivers in the parallel interface are configured to receive the same data signal, then all other data signals (including one on a spare data line if necessary in the case of a faulty data line) can only be received by a single receiver in order to permit continuous data recovery of all N data signals.

An output switching network 50 is configured under program control to route the outputs of the appropriate N+1 bit receivers to the N-wide output data bus $Q_1$ through $Q_N$ 90. Additionally, for reasons described below, the output switching network 50 couples the output of the bit receiver being calibrated to a calibration logic block 60 via connection 62, and the output of a second receiver to a qualification logic block 80 via connection 82.

When a bit receiver is being calibrated, the output switching network 50 routes the output of that bit receiver to the calibration logic 60 via connection 62. This enables the calibration logic to sense the response of the bit receiver in reaction to a calibration algorithm, for example, for the purpose of optimizing the performance of that bit receiver. Some receiver calibration routines may involve processes that can corrupt or destroy the data being processed by that receiver. For example, in order to measure receiver eye amplitude margins it is often necessary to apply large offsets to the input of a bit slicer in order to collapse the input data eye. Once this is done, it is common to measure a bit error rate of the received data. However, in order to measure a bit error rate, the received data pattern must be known. The offset required to collapse the data eye when a logic '1' bit is received is different (at the least, by the sign of the offset applied, but potentially different in sign and magnitude) than the offset required to perform the same function when a logic '0' bit is received. Since the received data has been corrupted in the process of calibrating the bit receiver, and since the received data pattern is not known a priori, it is required that an alternate parallel receiver detect the data. Information from this parallel receiver can then be used to qualify assumptions data decisions made by the adjacent receiver and/or the calibration logic during the process of bit receiver calibration. As another example, sign-sign least-mean squared (SS-LMS) algorithms for the adaptation of an equalizer also require valid data derived from a path in parallel to the path that includes the equalizer being adapted. In the architecture of FIG. 1, the input switching network 40 and the use of a redundant spare data line ensures that a second bit receiver can receive the same input signal as the bit receiver being calibrated even if a transmission channel is faulty requiring use of a spare data line. This second bit receiver is available to provide uncorrupted data such that measurements on the bit receiver being calibrated can be appropriately qualified or filtered as required by a calibration algorithm. The output switching network couples (via connection 82) the output of the parallel receiver to the qualification logic 80 that is used to qualify or filter assumptions that might be made by the calibration logic 60 as needed during the normal calibration of bit receiver. It is understood that the receiver providing data to the qualification logic is also simultaneously coupled to one of the $Q_1$ through $Q_N$ output data signals.

Figure 2:
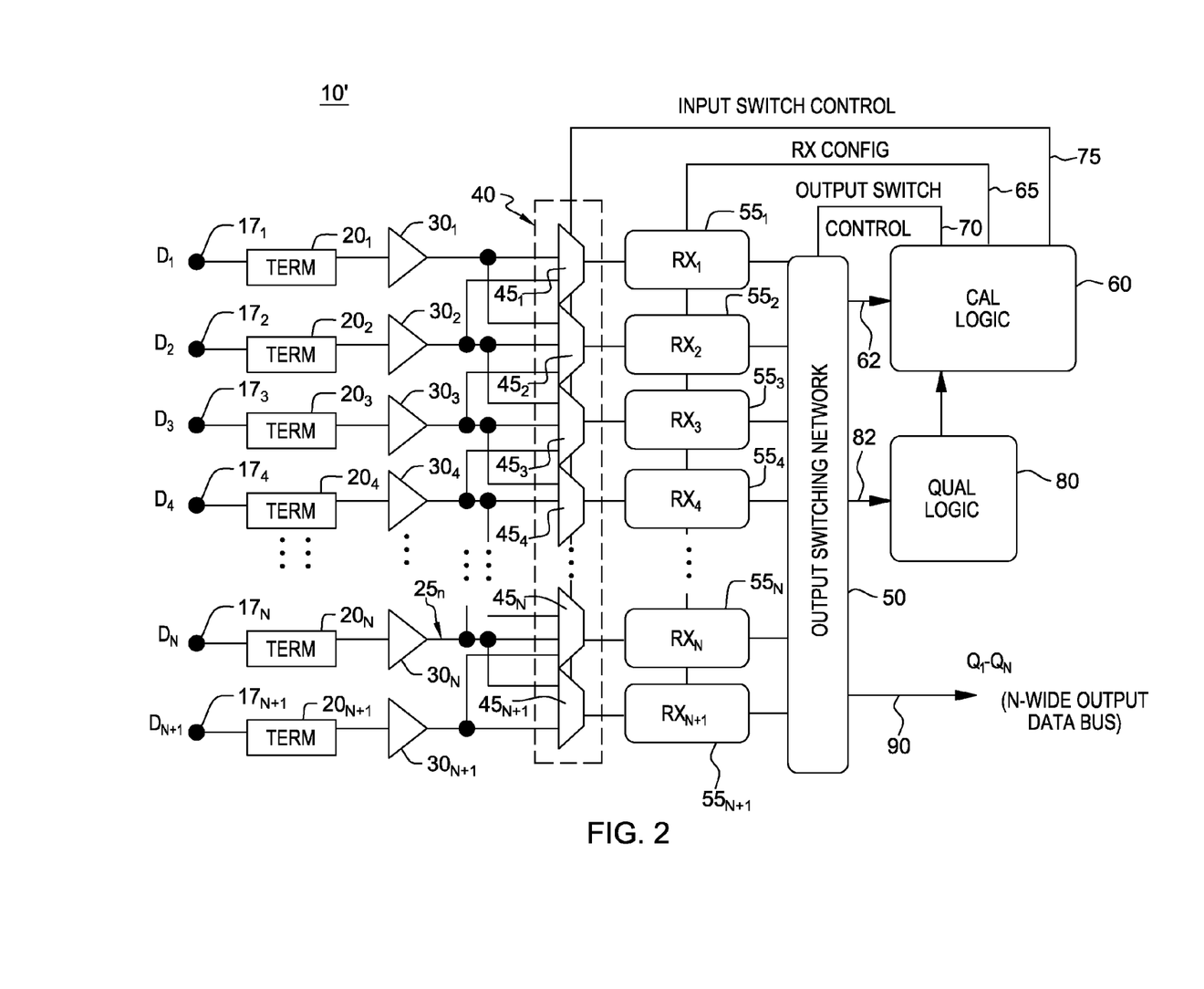
FIG. 2 depicts an alternate embodiment of a fault-tolerant parallel receiver architecture 10' using receiver redundancy.

FIG. 2 depicts an alternate embodiment of a parallel I/O bus interface 10' which includes $RX_1, \ldots, RX_{N+1}$ bit receivers 55 to receive N+1 bits of data $D_1, \ldots, D_{N+1}$. In this embodiment, a corresponding amplifier device or circuit $30_1, \ldots, 30_{N+1}$ is connected between a respective input pin $17_1, \ldots, 17_{N+1}$/termination $20_1, \ldots, 20_{N+1}$ and corresponding MUXs $45_1, \ldots, 45_{N+1}$ of the input switching network 40. This amplifier device or circuit $30_1, \ldots, 30_{N+1}$ may function as a buffer, a variable gain amplifier (VGA), and in some embodiments, includes an equalizer such as a feedforward equalizer (FFE) or a continuous-time linear equalizer (CTLE).

The embodiments of FIG. 1 and FIG. 2 are not source-synchronous architectures in that the clock for controlling respective RX receiver timing operations are provided locally and not originated at the source transmitter.

Figure 3:
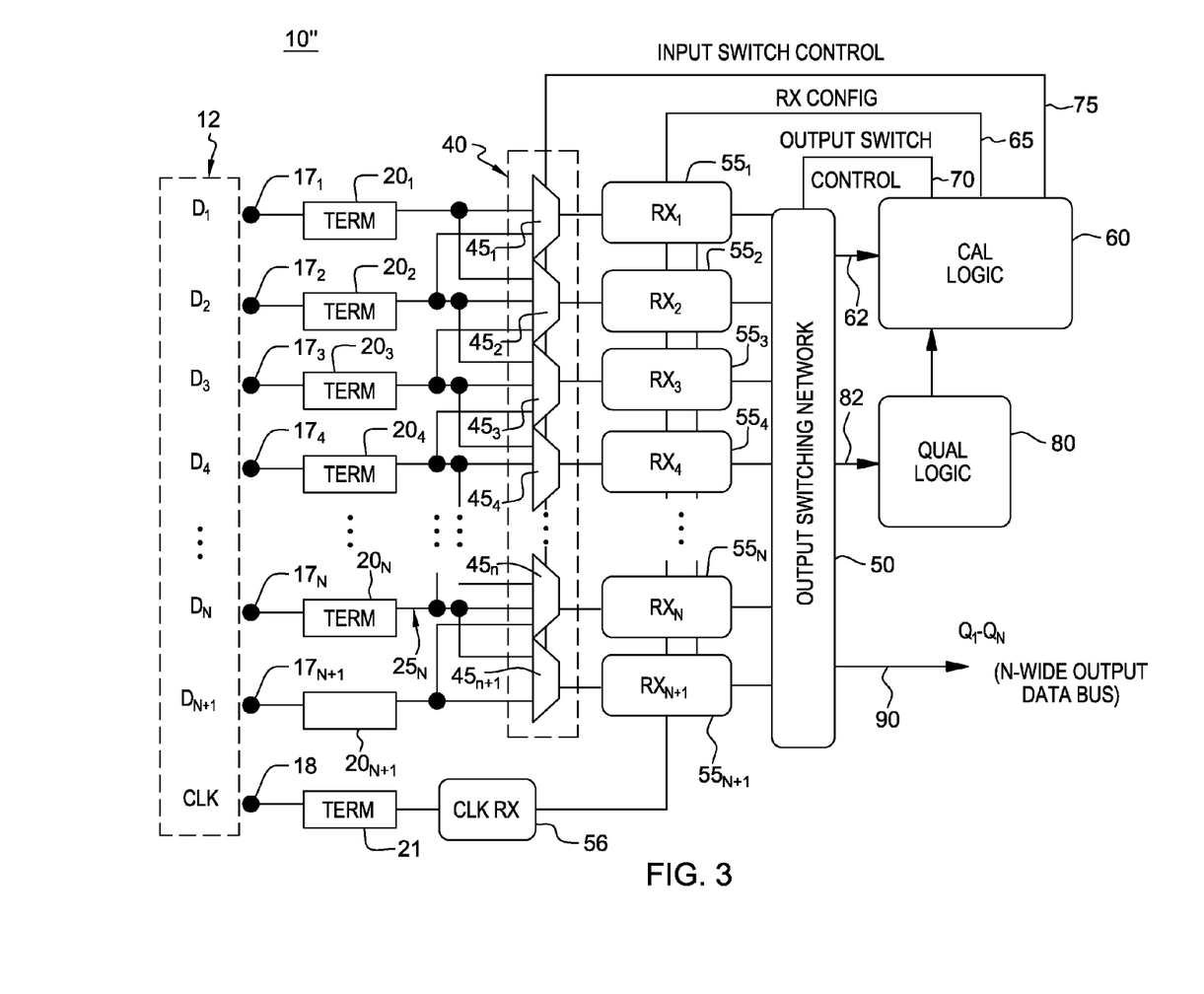
FIG. 3 depicts an embodiment of a fault-tolerant parallel receiver architecture 10" using receiver redundancy in a source synchronous architecture.

FIG. 3 shows an alternate embodiment of the parallel I/O bus interface of FIG. 1, in which circuitry is provided to receive a forwarded clock in a source synchronous I/O architecture 10". In the embodiment of FIG. 3, a data source transmitter (not shown) broadcasts a clock CLK signal on a separate channel on the bus 12 in parallel with the multiple bits (bus data) $D_1, \ldots, D_{N+1}$. This technique alleviates the need for a high-bandwidth clock recovery loop, since timing jitter on the incoming data is correlated to timing jitter on the forwarded clock. At multi-Gb/s data rates, the received clock signal is aligned to each data bit such that all bit receivers in the bus optimally sample the incoming data. In the source synchronous parallel I/O bus interface 10", a clock (CLK) signal is received from respective transmitter over a clock line of bus 12 to respective I/O pin 18 having a respective connected impedance matching input connector or terminal 21 (e.g., a 50 ohm connector). Terminal 21 is coupled to a clock receiver device 56 (CLK RX). Mechanisms or methods for adjustment or rotation of the clock phase can be included in the clock receiver device 56, and/or may be implemented in each of the bit receivers $55_1$ through $55_{N+1}$.

Figure 4:
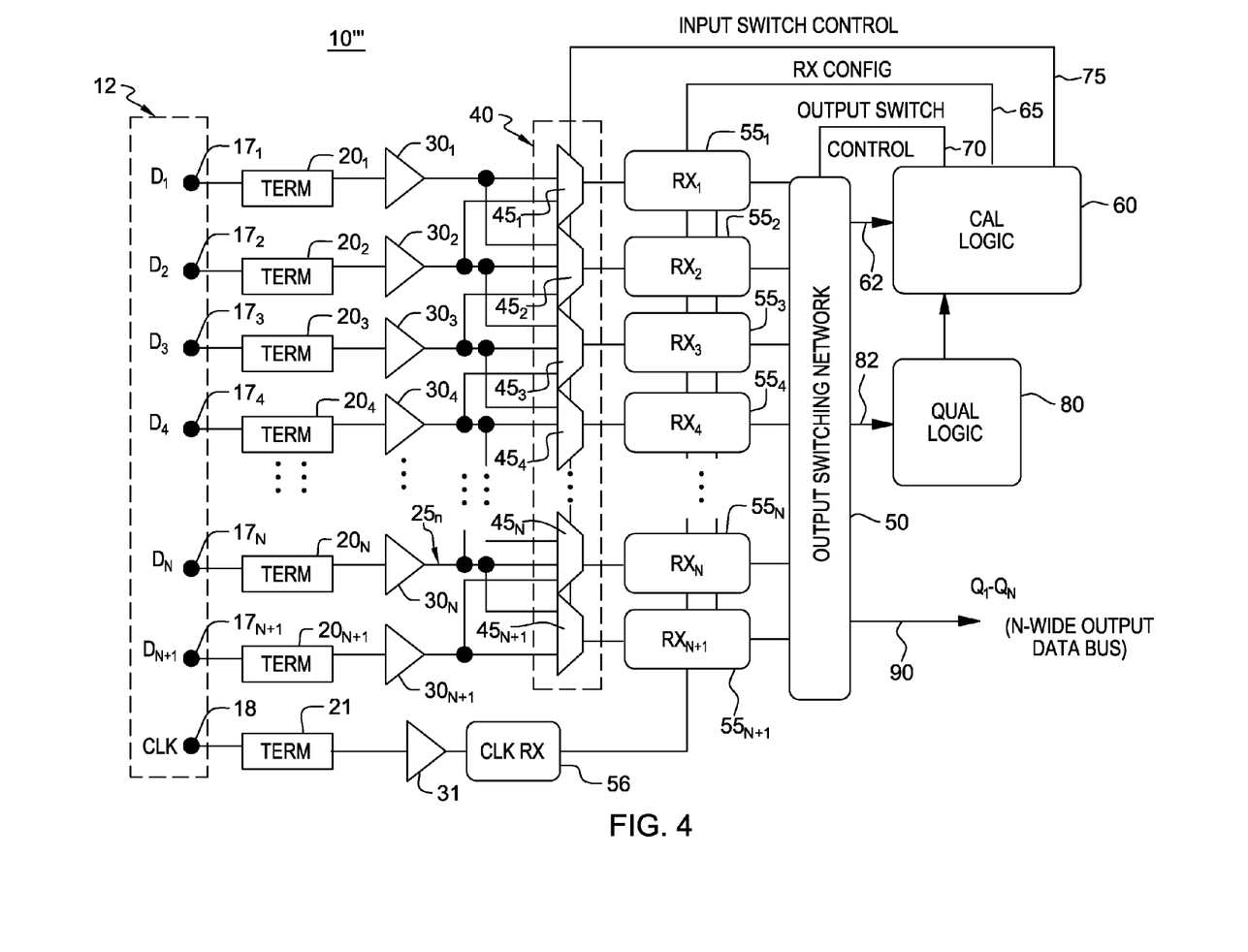
FIG. 4 depicts an alternate embodiment of a fault-tolerant parallel receiver architecture 10''' using receiver redundancy in a source synchronous architecture.

FIG. 4 depicts an alternate embodiment of a source-synchronous parallel receiver architecture 10''' using receiver redundancy as in the embodiment of FIG. 3, however, is configured to include corresponding amplifier device or circuit $30_1, \ldots, 30_{N+1}$ connected between a respective input pin $17_1, \ldots, 17_{N+1}$/termination $20_1, \ldots, 20_{N+1}$ and corresponding MUXs $45_1, \ldots, 45_{N+1}$ of the input switching network 40, and includes a further amplifier device or circuit 31 connected between a respective input pin 18/termination 21 and the corresponding clock receiver device 56 (CLK RX) in the source synchronous embodiment.

In each of the parallel I/O bus interface embodiments described with respect to FIGS. 1-4, and from the programmed Calibration Logic cycling algorithm described below, a second receiver RX is available to provide data necessary to qualify or filter decisions from an adjacent RX being calibrated, even when a data line is carrying data as a spare in the case of a faulty transmission channel. In the configuration of interface depicted FIGS. 1-4, it is ensured that another receiver is receiving the same data as the receiver that is being calibrated, such that the qualifications can be made.

Further, while N+1 pins are used to receive the N data bits (plus a spare if necessary), the embodiments of FIGS. 1-4 are alternately configured to receive differential data, in which 2*N pins would be required. Additionally, the data in signals $D_1$ through $D_{N+1}$ could contain multiple bits of information in a single symbol depending on the signaling scheme employed (e.g., pulse amplitude modulation).

Further, in each of the embodiments depicted in FIGS. 1-4, each of the bit receivers RX provide latched data signals to an output switching network 50 which may include a configuration of multiplexers or switches, but it may include a (first-in, first-out) FIFO structure that allows for data handoff between two different clock domains, and is usually required when the logic clock (the clock for the CAL logic block 60 and QUAL logic block 80) differs from the clock used for the receivers. In certain embodiments described herein above, the output switching network 50 could also include a word aligner to compensate for skew between bits and provide the referred to data alignment.

Further, in the embodiments depicted in FIGS. 1-4, the receiver calibration logic implements an algorithm represented by the pseudocode described herein below. This algorithm permits for periodic recalibration of all N+1 bit receivers, one at a time, while the other N bit receivers recover data. A programmed processor device or logic controller of the receiver and calibration logic device (CAL LOGIC) 60 may implement the algorithm to control the input switching network 40 through input switch control signals 75 and the output control network 50 through output switch control signals 70 to enable periodic recalibration of all bit receivers in the parallel interface. The algorithm configures the input network 40 and output switching network 50 such that the output a single bit receiver can be coupled to the calibration logic 60, the output of an adjacent bit receiver can be coupled to the qualification logic 80 as may be required by a calibration procedure, and N data bits can be passed from the input pins ($D_1$ through $D_{N+1}$) to corresponding output pins 90 ($Q_1$ through $Q_N$).

In addition, receiver calibration logic device 60 generate and provide the receiver configuration control signals 65 that provide tuning parameters (e.g., gain settings, equalizer settings, or sampling phase positions) to the receiver during the calibration process. Upon completion of a bit receiver calibration, these tuning parameters can be stored in a logic register (either located within the calibration logic 60 or within the respective bit receivers $55_1$ through $55_{N+1}$) and are held constant until the receiver is recalibrated.

It is understood that implementation of a FIFO or a word aligner would depend on implementation specific situations, such as skew conditions between $D_1$ through $D_N$ and/or $D_{N+1}$, and any frequency offset between the clocks that the logic runs off of (not shown) and the clock that the receivers operate off of (e.g., for the case of the source synchronous architecture).

In an alternate embodiment, the receiver RX device 55 may include a de-serializer element to cover situations where the output switching network 50 is implemented as low-speed synthesized logic as opposed to high-speed analog or high-speed custom digital logic. It is understood that the inclusion of a deserializer would increase the width of the parallel output bus Q from N to M*N, where M is the deserialization factor.

The method below, when implemented, steps down through the parallel configuration of receiver devices $55_1, \ldots, 55_{N+1}$ (i.e., "walking" from the top receiver to the bottom receiver), calibrating each one while ensuring that data is still processed on another receiver and passed through to the output. In one embodiment, after stepping down, there is then the need to step up (i.e., walking from the bottom to the top). The calibration logic handles the configuration of all the input/output switching networks, as well as the calibration of the individual receivers. Steps include performing the actual calibration of a receiver and, other steps to ensure uninterrupted data transmission from the input D to the outputs 90 Q. This calibration could include, but is not limited to: sampling phase or timing adjustment, offset compensation, equalizer adaptation or retraining, link diagnostics and eye margin measurements.

Figure 5:
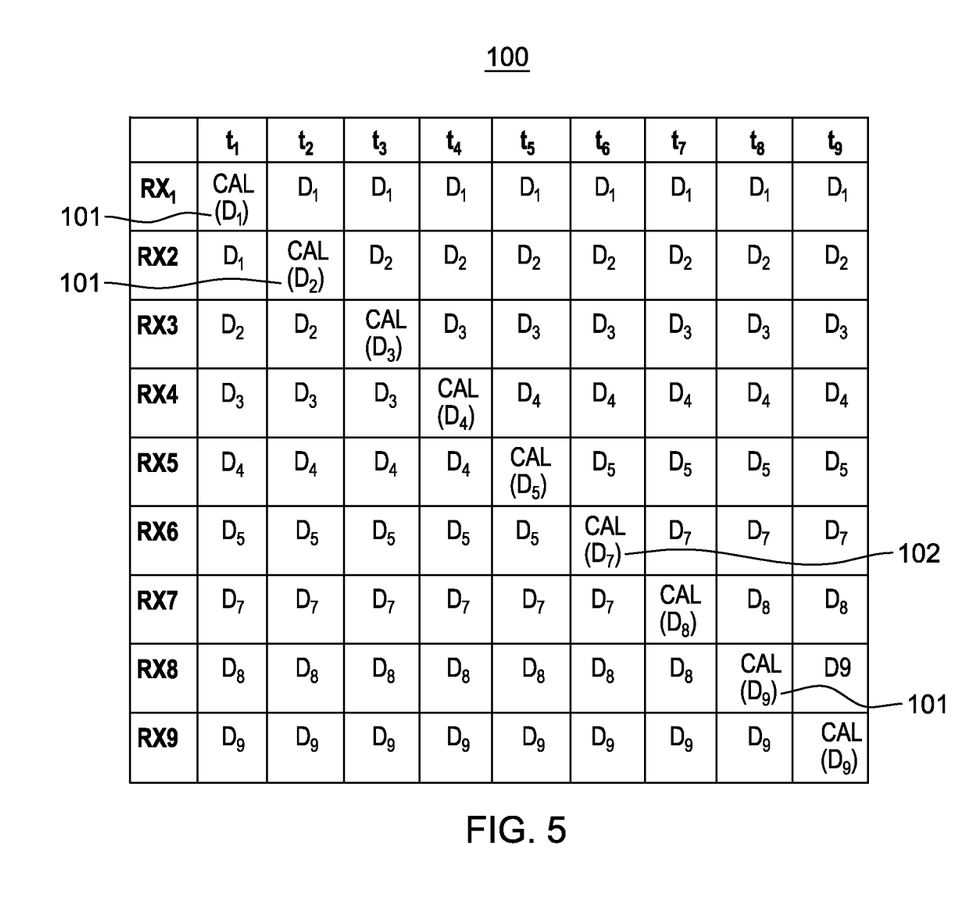
FIG. 5 illustrates an example cycling algorithm implemented in the fault-tolerant parallel receiver architectures of FIGS. 1-4 which involves cycling through all N+1 receivers from 1 to N+1 for calibration of each receiver one at a time.

FIG. 5 illustrates an example chart 100 depicting application of a calibration procedure and the logic for configuring the architectures shown and described with respect to FIGS. 1-4 using N+1 receiver such that one of those receivers could be calibrated while N receivers are always available to receive the N bits of data. That is, the algorithm cycles through N+1 receivers to permit periodic recalibration of each receiver (one at a time) while N inputs are processed continuously and uninterrupted, even in the presence of a fault in a transmission channel providing one of the N+1 input data signals.

More particularly, FIG. 5 illustrates an example chart 100 depicting application of a calibration procedure and the logic for configuring the architectures shown and described with respect to FIGS. 1-4. In the following, the example algorithm is configured to cycle through nine (9) receivers $RX_1$-$RX_9$, calibrating each receiver one at a time while processing the eight (8) data signals continuously on the eight receivers that are not being calibrated at that time. The example chart 100 depicting the cycling algorithm illustrates operation in the case where $D_6$ is a non-functional data signal due to a fault. Consequently, it is assumed in this illustration that data signals $D_1$ through $D_5$, and $D_7$ through $D_9$ are valid data signals. For each time slice $t_1$ through $t_9$, the table 100 shows the receivers processing data signals $D_1$ through $D_9$ (excluding $D_6$). Additionally, the receiver being calibrated in each time slice is indicated. As described above, data from an adjacent lane may be needed to qualify assumptions made during the calibration process. The chart also indicates the data signal 101 used to qualify the calibration processes of a receiver in a given time slice.

FIG. 5 depicts nine time slices $t_1$ through $t_9$, each corresponding to the calibration of one of the nine receivers $RX_1$ through $RX_9$. During time $t_1$, the input switching network is configured such that data signal D1 is passed to the inputs of both $RX_1$ and $RX_2$. As a result, $RX_1$ can be calibrated, while $RX_2$ can receive and process the data signal $D_1$. Also during time $t_1$, the output switching network is configured such that the output of $RX_1$ is routed to the calibration logic, while the output of $RX_2$ is routed both to the qualification logic as well as to the output bus. Consequently, data decisions made by $RX_2$ in response to the input data signal $D_1$ can be used to qualify the calibration process of receiver $RX_1$. This is indicated in FIG. 5 as "Cal ($D_1$)" 101, meaning that during time slice $t_1$, $RX_1$ is being calibrated, with necessary data qualifications provided by the receiver processing data signal $D_1$ (namely, $RX_2$). At the end of time slice $t_1$, it is assumed that the calibration of $RX_1$ has been completed. During the transition from time slice $t_1$ to $t_2$, the input and output switching networks must be configured such that $RX_1$ is available to process and recover data signal $D_1$ (previously processed by $RX_2$), while $RX_2$ can be calibrated without interrupting recovery of any data signal. This can be accomplished by the following sequence. First, calibration of $RX_1$ ends, meaning that $RX_1$ is receiving and processing data signal $D_1$. Next, the output switching network routes the output of $RX_1$ to the output data bus (at this point, $RX_2$ is effectively out of service and is no longer recovering data signal $D_1$). Next, the input switching network is configured such that the input to receiver $RX_2$ is connected to data signal $D_2$. Next, the output switching network routes the output of $RX_2$ to the calibration logic and the output of $RX_3$ to the qualification logic (with the latter still also routed to the output data bus as it was during time slice $t_1$). Once these tasks have been accomplished, time slice $t_2$ begins and receiver $RX_2$ can be calibrated, using data qualifications provided by the output of receiver $RX_3$ which is also receiving data signal $D_2$.

The same processing occurs at each time slice, such as shown in FIG. 5, each time slice shows a similar pattern with the receiver being calibrated in each time slice indicated, along with the data signal 101 used to qualify the calibration processes. Thus in time slice $t_2$, receiver $R_2$ is being calibrated with qualification data ($D_2$) programmed to be received from receiver $RX_3$. Similarly, in time slice $t_3$, receiver $RX_3$ is calibrated with qualification data ($D_3$) programmed to be received from receiver $RX_4$, and so forth. This procedure continues until the end of time slice t5. As data signal D6 is unavailable due to a fault (which, in this example, was detected during the receiver initialization routines), the cycling algorithm must skip over this data signal during the calibration of the N+1 receivers. Hence at the end of $t_5$, the input switching network must be configured such that the input of $RX_6$ is connected to the input data signal $D_7$. During $t_5$, $RX_6$ can be calibrated, using data signal $D_7$ 102 to qualify the calibration processes.

It is pointed out that in all scenarios described, the receiver is configured to be calibrated during the data signal that it this receiver will be processing and recovering immediately upon completion of its calibration. For example, during $t_1$ the input switching network is configured such that receiver $RX_1$ is receiving data signal $D_1$ while it is being calibrated. Upon the completion of its calibration processes, $RX_1$ is then deployed back into service and is configured to recover data signal $D_1$ during time slice $t_2$.

Each time slice shows the time it takes to calibrate a receiver, and may be a longer time interval than the unit interval associated with the data symbols. For example, 10-Gb/s non-return-to-zero (NRZ) binary data has a unit interval of 100 ps, while the time slices shown in FIG. 5 may represent 10's or 100's of microseconds depending on the calibration procedures that are performed.

Figure 6:
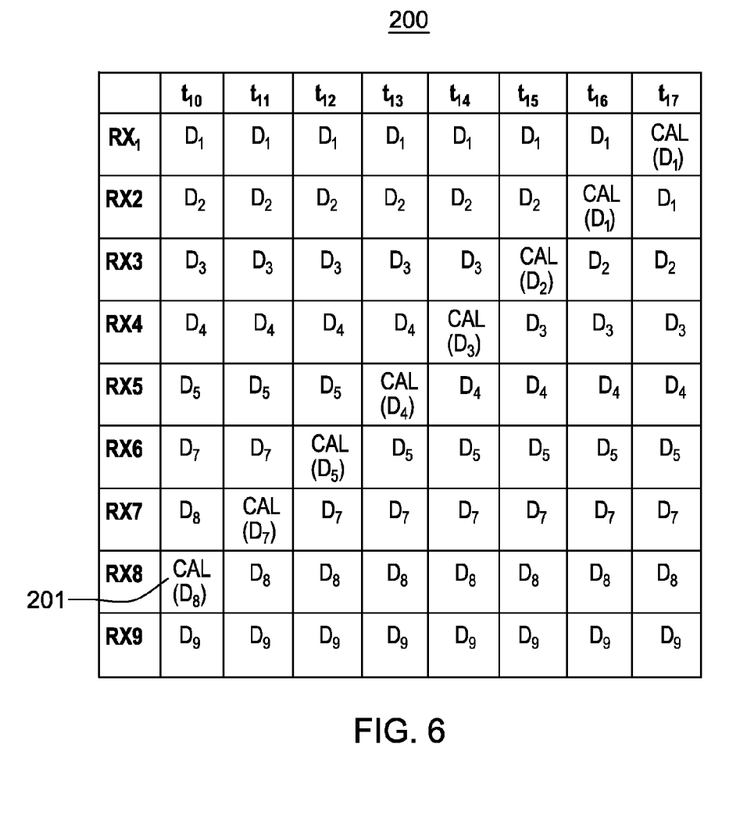
FIG. 6 illustrates an example cycling algorithm implemented in the fault-tolerant parallel receiver architectures of FIGS. 1-4 which involves cycling through all N+1 receivers from N+1 to 1 for calibration of each receiver one at a time.

The algorithm depicted in FIG. 5 and described above has calibrated, in order, all receivers from 1 to N+1 (where N=8). At the end of time slice $t_9$, one possibility is to continue this cycling calibration routine by calibrating the receivers in the reverse order from N+1 to 1. However, since $RX_9$ has most recently been calibrated during time slice $t_9$, it is more logical to now configure the input and output switching networks such that $RX_8$ can be calibrated next. A procedure 200 for calibrating the receivers in the reverse order is depicted in FIG. 6, which begins with time slice $t_{10}$ that is assumed to occur immediately after time slice $t_9$ in FIG. 5. Again, each receiver is calibrated while receiving data that it will be processing and recovering when it is returned to service. For example during time slice $t_{10}$, receiver $RX_8$ is calibrated while receiving input data signal $D_8$ 201; during time slice $t_{11}$, $RX_8$ is used to process and recover data signal $D_8$. Each receiver is calibrated in this fashion from time slices $t_{10}$ through $t_{17}$, where the duration of each time slice is assumed to be the same or approximately the same as time slices $t_1$ through $t_9$ in FIG. 5. It is pointed out that the conditions in time slice $t_{17}$ in FIG. 6 are identical to those of time slice $t_1$ in FIG. 5, implying that the calibration cycling depicted in these two figures could continue indefinitely.

Figure 7:
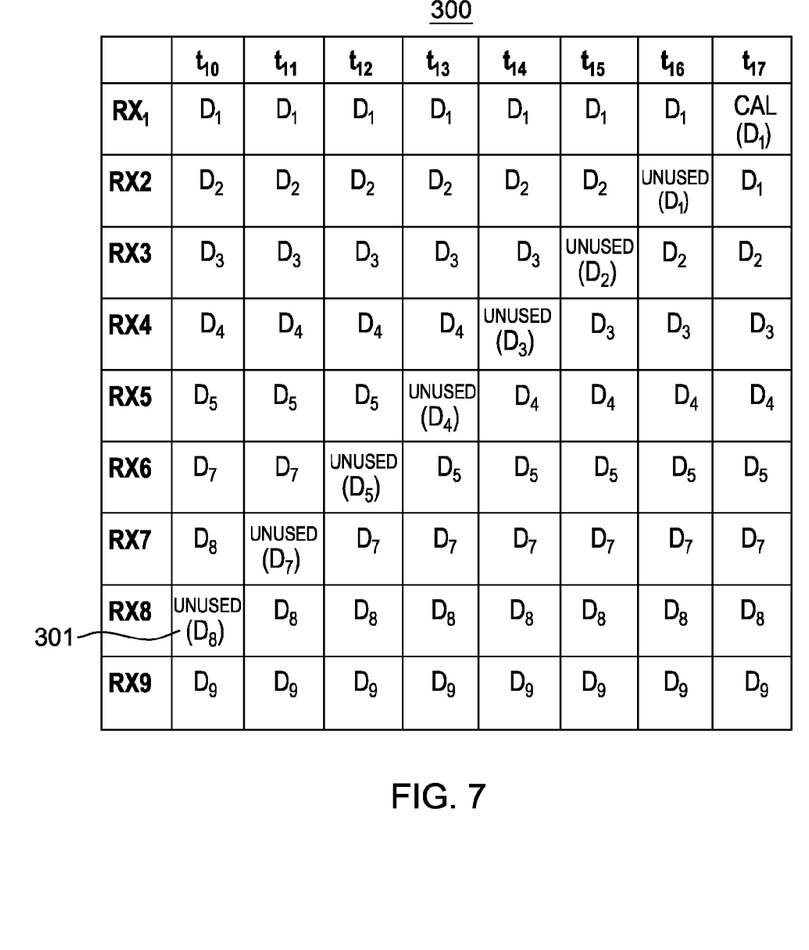
FIG. 7 illustrates an example cycling algorithm implemented in the fault-tolerant parallel receiver architectures of FIGS. 1-4 which involves cycling through all N+1 receivers from N+1 to 1 without calibrating the receivers.

It is noted that in the above procedure depicted by both FIG. 5 and FIG. 6, receivers at the ends of the bus are calibrated more frequently than receivers in the middle of the bus. For example, $RX_8$ is calibrated in time slice $t_8$ and again in time slice $t_{10}$. In contrast, $RX_5$ is calibrated during time slice $t_5$ but not again until time slice $t_{13}$. An alternative to the approach depicted in FIG. 6 is shown in FIG. 7. In the approach 300 depicted in FIG. 7, the input and output switching networks are configured to cycle through each receiver such that the state of the bit receivers and said switching networks returns to the original state in time slice t1 of FIG. 5. This is done without calibrating the receivers as the algorithm cycles through the bit receivers from N+1 back to 1; consequently, the time slices $t_{10}$ through $t_{17}$ in FIG. 7 can be much shorter than the time slices $t_1$ through $t_9$ in FIG. 5. During this cycling process, the receivers can be taken out of service one at a time while the input and output switching networks can be reconfigured to provide uninterrupted data recovery. An example is described as follows. At the completion of time slice $t_9$ in FIG. 5, $RX_9$ has completed calibration with data signal $D_9$ as its input. It can be placed back into service, and the output switching network can route the output of $RX_9$ to the output data bus. At this point, the output of $RX_8$ is not routed to the output data bus, hence the MUX at its input is free to switch from $D_9$ to $D_8$ without glitching output data. In the chart of FIG. 7, $RX_8$ is listed as "Unused ($D_8$)" 301 during time slice $t_{10}$, indicating that the output of $RX_8$ is unused in this time slice while its input is connected (via the input switching network) to data signal $D_8$. The input to $RX_7$ is also connected to data signal D8 during this time slice. Between time slices $t_{10}$ and $t_{11}$, the output switching network can be reconfigured such that $RX_8$ is put back in service to recover data signal $D_8$. At this time, the output of $RX_7$ is unused and its input MUX is free to switch from $D_8$ to $D_7$ without glitching the output data. This process continues as the cycling algorithm cycles through each receiver. At time slice $t_{17}$, the conditions depicted in FIG. 7 are identical to those of time slice $t_1$ in FIG. 5, implying that the calibration cycling depicted in these two figures could continue indefinitely.

Figure 8:
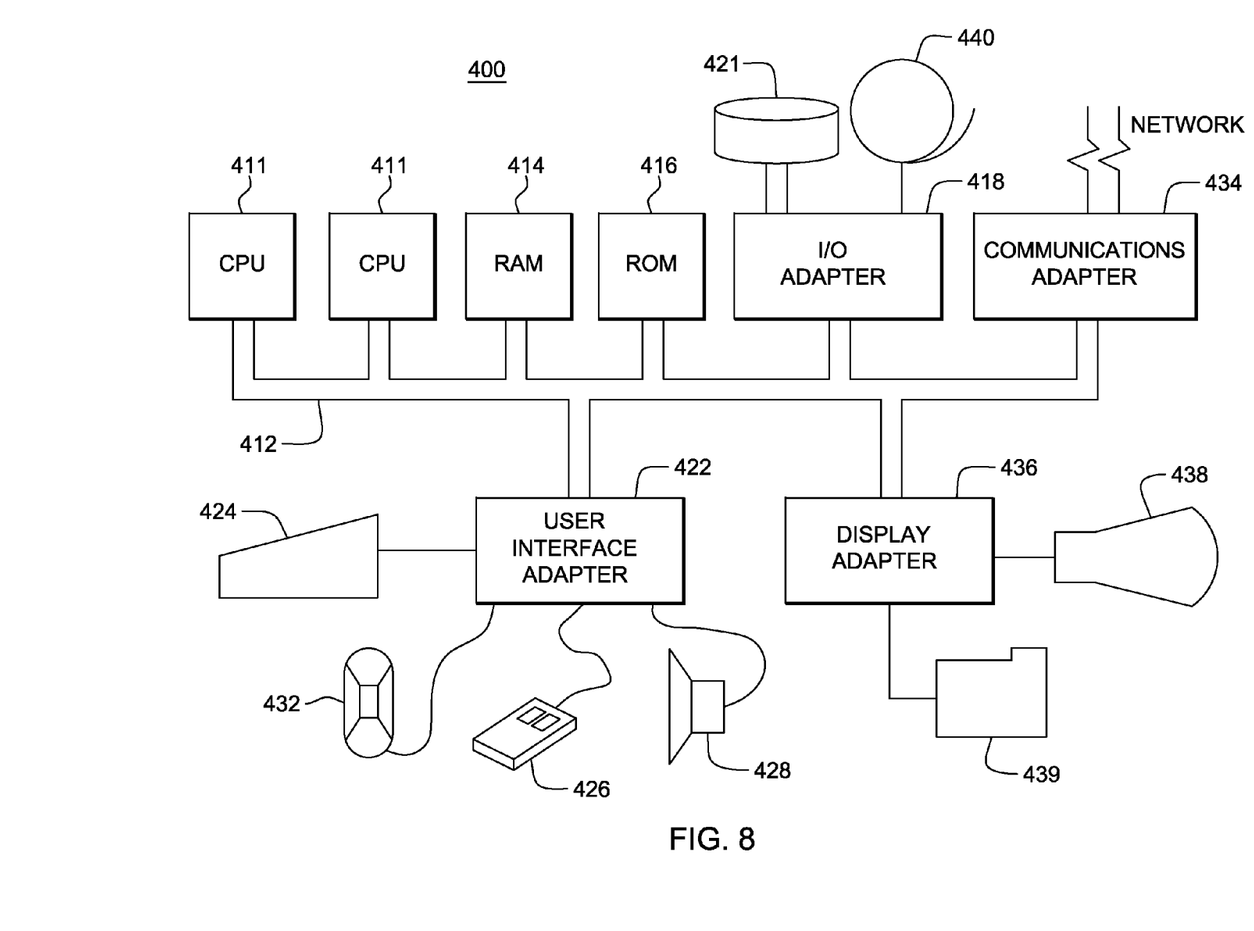
FIG. 8 illustrates an exemplary hardware configuration of a computing system 400 running and/or implementing the bus interface methods of the described embodiments.

FIG. 8 illustrates an exemplary hardware configuration of a computing system 400 running and/or implementing the parallel bus interface and method of operating as described herein with respect to FIGS. 1-5. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like). As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

The invention claimed is:

1. A method for calibrating receivers of a parallel I/O bus receiver interface, said method comprising:
   receiving N+1 parallel data signals along respective paths, one of said N+1 parallel data signals comprising a spare data signal;
   coupling received N parallel data signals along respective paths to corresponding N receiver devices of N+1 parallel-configured bit receiver devices, and coupling a remaining one received parallel data signal to two adjacent bit receivers or two adjacent bit receivers of two or three adjacent parallel bit receivers;
   calibrating, using a calibration logic device, one of said two adjacent bit receiver devices during a calibration cycle;
   qualifying, using a qualification logic device, data decisions made during calibration processes performed by the calibration logic device, wherein a same data signal being used for calibrating a receiver during said calibration cycle is provided to the adjacent receiver of either said two adjacent or said three adjacent bit receivers; and
   configuring an output switching network to route an output of the bit receiver being calibrated to said calibration logic block, and simultaneously route outputs of the remaining N bit receivers of the N+1 parallel-configured receivers as N-bit wide parallel data signal outputs, wherein one output of an adjacent receiver receiving said same data signals during said calibration cycle is simultaneously routed to said qualification logic block.

2. The method for calibrating receivers of claim 1, further comprising: receiving a forwarded clock signal from a transmitter for timing receiver operations at said interface.

3. The method for calibrating receivers of claim 1, further comprising: providing one or more of: an amplifier circuit, buffer circuit or equalizer circuit on each respective path for driving the received N+1 data signals to the input switching network.

4. The method for calibrating receivers of claim 2, further comprising: driving the received N+1 data signals to the input switching network by one or more of: an amplifier circuit, buffer circuit or equalizer circuit on each respective path.

5. The method for calibrating receivers of claim 1, wherein said input switching network comprises: N+1 parallel-configured Multiplexer (MUX) devices in correspondence with said N+1 parallel-configured bit receiver devices, where the inputs of each MUX are coupled to one or more of said N parallel data signals.

6. The method for calibrating receivers of claim 5, further comprising:
   issuing, by said calibration logic device, control signals to perform periodic recalibration of each said N+1 parallel-configured bit receiver devices.

7. The method for calibrating receivers of claim 6, further comprising:
   configuring, using said control signals, each said N+1 parallel-configured Multiplexer (MUX) device of said input switching network to pass said received N+1 parallel data signals to respective bit receiver devices during calibration, said configuring comprising, during a calibration cycle:
   configuring a first of said parallel-configured MUX devices corresponding to a first bit receiver device to route a respective single received data signal to said first bit receiver, its adjacent parallel bit receiver device, or both;
   configuring a last of said parallel-configured MUX devices corresponding to the N+1 bit receiver device to route a respective single received data signal to the N+1 bit receiver device, its adjacent parallel bit receiver device, or both; and
   configuring each remaining parallel-configured MUX device corresponding to bit receiver devices between the first and last of said parallel-configured MUX devices to route a respective single received data signal to one or two adjacent bit receiver devices of three adjacent bit receiver devices.

8. The method for calibrating receivers of claim 6, wherein said issued control signals to perform periodic recalibration further comprises: control signals to configure N of said N+1 parallel-configured bit receiver devices to receive and process a respective received bit data signal for said N-bit wide parallel data signal outputs.

9. The method for calibrating receivers of claim 6, wherein said issued control signals to perform periodic recalibration further comprises: control signals to configure said output switching network to couple respective said N bit receiver device outputs providing said N-bit wide parallel data signal outputs.

10. The method for calibrating receivers of claim 6, further comprising:
    configuring said input and output switching network to:
    cycle through said N+1 bit receivers in a first direction from 1 to N+1 to perform said calibrating of said N+1 receivers while receiving N+1 data signals at each cycle to permit periodic recalibration of each receiver while simultaneously providing said N-bit wide parallel data signal outputs.

11. The method for calibrating receivers of claim 10, further comprising:
    configuring said input and output switching network to:
    cycle through said N+1 bit receivers in a second direction from N+1 to 1 to perform said calibrating of said N+1 receivers while receiving N+1 data signal to permit periodic recalibration of each receiver while simultaneously providing said N-bit wide parallel data signal outputs.

12. The method for calibrating receivers of claim 10, configuring said switching network to return to cycle through receivers from N+1 to 1 to perform the next calibration of N+1 bit receivers in said first direction.

13. A parallel I/O bus receiver interface comprising:
    an input switching network configured to receive and couple N+1 parallel data signals along respective paths to corresponding receiver devices of N+1 parallel-configured bit receiver devices, one of said N+1 parallel data signals comprising a spare data signal, N received parallel data signals configured for coupling along respective paths to corresponding N receiver devices of N+1 parallel-configured bit receiver devices, and a remaining one received parallel data signal configured for coupling to two adjacent bit receiver devices of two or three adjacent parallel bit receivers devices;
    a calibration logic device used for calibrating one of said N+1 bit receivers during a calibration cycle;
    a qualification logic device used to qualify data decisions made during calibration processes performed by the calibration logic device, wherein a same data signal being input to a receiver for calibrating the receiver during said calibration cycle is provided to either an adjacent receiver of the receiver being calibrated, or one of two bit receivers adjacent to the receiver being calibrated; and
    an output switching network configured to route an output of the bit receiver being calibrated to said calibration logic block, and simultaneously route outputs of the remaining N bit receivers of the N+1 parallel-configured receivers as N-bit wide parallel data signal outputs, wherein one output of an adjacent receiver receiving said same data signal during said calibration cycle is simultaneously routed to said qualification logic block.

14. The parallel I/O bus receiver interface of claim 13, further comprising: an input to receive a forwarded clock signal from a transmitter for timing data receiver operations.

15. The parallel I/O bus receiver interface of claim 13, further comprising: one or more of: an amplifier circuit, buffer circuit or equalizer circuit on each respective path for driving the N+1 data signals to the input switching network.

16. The parallel I/O bus receiver interface of claim 14, further comprising: one or more of: an amplifier circuit, buffer circuit or equalizer circuit on each respective paths for driving the N+1 data signals to the input switching network.

17. The parallel I/O bus receiver interface of claim 13, wherein said input switching network comprises: N+1 parallel-configured Multiplexer (MUX) devices in correspondence with said N+1 parallel-configured bit receiver devices, where the inputs of each MUX are coupled to two or more of N+1 parallel data signals.

18. The parallel I/O bus receiver interface of claim 17, wherein said calibration logic device issues control signals for configuring each said N+1 parallel-configured Multiplexer (MUX) devices of said input switching network to pass said received N+1 parallel data signals to respective bit receiver devices, wherein, during a calibration cycle, a first of said parallel-configured MUX devices corresponding to a first bit receiver device configured to route a respective single received data signal to said first bit receiver device, an adjacent bit receiver device, or both;

a last of said parallel-configured MUX devices corresponding to the N+1 bit receiver device configured to route a respective single received data signal to said N+1 bit receiver device, an adjacent bit receiver device, or both; and, each remaining parallel-configured MUX devices between said first and last configured to route a respective single received data signal to one or two adjacent bit receiver devices of three adjacent bit receiver devices.

19. The parallel I/O bus receiver interface of claim 13, wherein said calibration logic device issues control signals to configure N of said N+1 parallel-configured bit receiver devices to receive and process a respective received bit data signal for said N-bit wide parallel data signal outputs.

20. The parallel I/O bus receiver interface of claim 13, wherein said calibration logic device issues control signals to configure said output switching network to provide said N-bit wide parallel data signal outputs.

21. The parallel I/O bus receiver interface of claim 13, wherein said calibration logic device issues control signals to perform periodic recalibration of each said N+1 parallel-configured bit receiver devices.

* * * * *